United States Patent
Yang

(10) Patent No.: US 10,652,265 B2
(45) Date of Patent: May 12, 2020

(54) METHOD AND APPARATUS FOR NETWORK FORENSICS COMPRESSION AND STORAGE

(71) Applicant: Lianqun Yang, Tianjin (CN)

(72) Inventor: Lianqun Yang, Tianjin (CN)

(*) Notice: Subject to any disclaimer, the term of this patent is extended or adjusted under 35 U.S.C. 154(b) by 346 days.

(21) Appl. No.: 15/870,103

(22) Filed: Jan. 12, 2018

(65) Prior Publication Data

US 2019/0222603 A1 Jul. 18, 2019

(51) Int. Cl.
*H04L 29/06* (2006.01)
*G06F 21/55* (2013.01)
*G06F 16/22* (2019.01)

(52) U.S. Cl.
CPC .......... *H04L 63/1433* (2013.01); *G06F 21/55* (2013.01); *G06F 21/554* (2013.01); *H04L 63/1416* (2013.01); *H04L 63/1425* (2013.01); *G06F 16/2255* (2019.01); *H04L 63/20* (2013.01)

(58) Field of Classification Search
CPC .. H04L 63/1433; H04L 63/1416; G06F 21/55
See application file for complete search history.

(56) References Cited

U.S. PATENT DOCUMENTS

| | | | |
|---|---|---|---|
| 9,003,511 B1* | 4/2015 | Yang | G06F 21/55 726/13 |
| 9,635,132 B1* | 4/2017 | Lin | H04L 69/04 |
| 10,366,229 B2* | 7/2019 | Martin | H04L 63/1425 |
| 10,454,965 B1* | 10/2019 | Grange | H04L 63/1416 |
| 10,484,413 B2* | 11/2019 | Kar | H04L 63/1416 |
| 2013/0055400 A1* | 2/2013 | Lee | H04L 63/1433 726/25 |
| 2013/0212669 A1* | 8/2013 | Wilson | H04L 63/1416 726/12 |
| 2018/0096149 A1* | 4/2018 | Morkovsk | G06F 21/52 |
| 2018/0165345 A1* | 6/2018 | Nomura | G06F 11/1453 |
| 2019/0052649 A1* | 2/2019 | Ardeli | H04L 63/1416 |
| 2019/0132348 A1* | 5/2019 | Ng | H04L 9/3242 |

FOREIGN PATENT DOCUMENTS

| | | |
|---|---|---|
| CN | 101572633 A | 11/2009 |
| CN | 104794170 A | 7/2015 |

* cited by examiner

*Primary Examiner* — Lynn D Feild
*Assistant Examiner* — Viral S Lakhia
(74) *Attorney, Agent, or Firm* — McCoy Russell LLP

(57) ABSTRACT

The present invention provides a method for detecting a website attack, comprising: selecting multiple uniform resource locators (URLs) from history access records of a website; clustering the multiple uniform resource locators; and generating a whitelist from the multiple uniform resource locators according to a clustering result. In some embodiments of the present invention, a common OWASP attack at URL level can be checked.

9 Claims, 7 Drawing Sheets

UserA visited on 2017/1/1

Time: 2017/_1_/1

Welcome, _UserA_

In RocksDB, the LSM tree is consistent of a list of SST files in the file system, besides WAL logs. After each compaction, compaction output files are added to the list while the input ones are removed from it. However, input files do not necessarily qualify to be deleted instantly.

UserB Visited on 2017/2/1

Time: 2017/_2_/1

Welcome, _UserB_

In RocksDB, the LSM tree is consistent of a list of SST files in the file system, besides WAL logs. After each compaction, compaction output files are added to the list while the input ones are removed from it. However, input files do not necessarily qualify to be deleted instantly.

UserC Visited on 2017/3/1

Time: 2017/_3_/1

Welcome, _UserC_

In RocksDB, the LSM tree is consistent of a list of SST files in the file system, besides WAL logs. After each compaction, compaction output files are added to the list while the input ones are removed from it. However, input files do not necessarily qualify to be deleted instantly.

FIG. 4

Hash Mapping Table

| Hash value | Original data content |
|---|---|
| 21A4235D | Time···UserA |
| ED3267A8 | In RocksDB, the LSM tree is consistent of a list ... |
| 773A3EFD | Time···UserB |

Data Mapping Table

| Data | Data block (range, hash value) |
|---|---|
| 2017/1/1_UserA_ http://somewebsite/home.html | 0-32: 21A4235D<br>33-134: ED3267A8 |
| 2017/2/1_UserB_ http://somewebsite/home.html | 0-32: 773A3EFD<br>33-134: ED3267A8 |

FIG. 5

*Time: 2017/1/1*

*Welcome, UserA*

*In RocksDB, the LSM tree is consistent of a list of SST files in* the file system, besides WAL logs. After each compaction

*Time: 2017/2/1*

*Welcome, UserBBBBBBBB*

*In RocksDB, the LSM tree is* consistent of a list of SST files in the file system, besides WAL logs. After each compaction a) Fixed length segmentation

*Time: 2017/1/1*

*Welcome, UserA*

In RocksDB, the LSM tree is consistent of a list of SST files in the file system, besides WAL logs. After each compaction

*Time: 2017/2/1*

*Welcome, UserBBBBBBBB*

In RocksDB, the LSM tree is consistent of a list of SST files in the file system, besides WAL logs. After each compaction b) Variable length data segmentation

FIG. 6

METHOD AND APPARATUS FOR NETWORK FORENSICS COMPRESSION AND STORAGE

FIELD OF THE INVENTION

The present invention relates to the field of network security technologies, and in particular, to a method and an apparatus for network forensic compression and storage.

BACKGROUND OF THE INVENTION

Network forensics refers to the research on network data flow for civil, criminal and regulatory events, with the goal of protecting users and resources and preventing illegal incursions and other criminal activities arising from the constantly expanding network connection. As cybercrime is rampant today, network forensics plays a decisive role in computer forensics and judicial identification technologies, and in the event of cyber-security incidents such as cyber-attacks, it is necessary to investigate how the events take place. In view of this, the state promulgated the "Cyber Security Law" from the legal level stipulates that the network service provider network log must be stored more than 6 months.

Network forensics must collect and store network data streams that support subsequent forensic analysis. Traditional practices include collecting network service operations logs at high level of abstraction, such as site access logs, and collecting raw network byte streams at low level of abstraction, such as PCAP, PCAPNG, and other network packet storage files. However, on the one hand, the network abstraction logs at the high level of abstraction generally have only simple summary information and the relevant network operation details are lost, for example, there is only the header of the HTTP request, but the content of the HTTP request and the response are not saved. On the other hand, the network original byte stream at the low level of abstraction has the most complete information, but requires huge data storage capacity. The data storage capacity of 1 Gbps network traffic is up to 11 T per day, which consumes massive storage resources. Therefore, how to overcome the bottleneck of resources caused by massive data transmission and storage is a problem that network forensics urgently needs to solve.

In order to solve this contradiction, the prior art provides a strategy of compressing and storing the original network data stream, and usually performs hash mapping storage on the original network data stream by using a Bloom-filter algorithm, at the same time, it does not affect the support of the post-analysis mechanism by the compressed data and reconstruct the network events. This strategy to some extent reduces the storage space requirements for data.

On this basis, the prior art also proposes further improved methods. Chinese patent application CN101572633A proposes a network forensics method and system for extracting plaintext segments from an original network data stream and a network connection record corresponding to the plaintext segment for Bloom filter mapping so as to filter out a large amount of network protocol structure data and control class data irrelevant to content forensics in the original data stream, further reducing occupation of storage space and prolonging storage time of basic data of network forensics. Chinese patent application CN104794170A proposes a method for traceability of network forensics content based on a fingerprint multiple Hash Bloom filter. The method reconstructs the captured original network traffic data packets and constructs an application-layer session. At each time interval, the session content is stored in chunks in the enhanced fingerprint multiple Hash Bloom filter, and the session index table is saved. The method can obtain the traceability of the communication content in the original data stream and improve the traceability and accuracy of the network forensics content. However, the inventor has found that these prior arts are all aimed at the compression and storage of the original byte stream of the network with a low level of abstraction. However, due to the massive nature of the original network data stream, these compression and storage methods still consume a large amount of storage space. In the process of forensics, the reconfiguration of network events is analysed, and the Bloom filter algorithm itself also has a certain false alarm rate. Therefore, there is a need for a more simple and efficient network forensic compression and storage method.

SUMMARY OF THE INVENTION

In one aspect, the present invention provides a method for network forensics compression and storage, comprising the following steps:

Step S1, extracting high level network service operation data;

Step S2, segmenting the network service operation data to obtain a plurality of data blocks;

Step S3, calculating a hash value for each data block;

Step S4, determining whether the hash value already exists in the hash mapping table or not, if the hash value already exists in the hash mapping table, saving the mapping relationship between the data block and the corresponding hash value in the data mapping table; if the hash value does not exist in the hash mapping table, saving the mapping relationship between the hash value and the corresponding original data content in the hash mapping table and then saving the mapping relationship between the data block and the corresponding hash value in the data mapping table.

Preferably, the network service operation data comprises network service operation detailed information reflecting user's network operation details.

In some embodiments, the step of segmenting the network service operation data in step S2 comprises the following steps:

Step S21, segmenting the network service operation data according to a fixed length;

Step S23, moving the segmentation boundary of the network service operation data back and forth according to a predetermined byte range till a byte string with the highest occurrence probability, then replacing the segmentation boundary with starting position of the byte string.

Preferably, before step S23, it further comprises:

Step S22, loading a byte string dictionary table, which contains occurrence probability of the byte string.

Preferably, the byte string dictionary table is a fixed-length byte string dictionary table trained based on corpora.

In another aspect, the present invention provides an apparatus for network forensic compression and storage, comprising the following modules:

A data extracting module for extracting high level network service operation data;

A data segmenting module for segmenting the network service operation data extracted by the data extraction module to obtain a plurality of data blocks;

A data mapping module for calculating a hash value for each data block obtained by the data segmenting module;

A data storage module for determining whether the hash value already exists in the hash mapping table or not, if the hash value already exists in the hash mapping table, saving the mapping relationship between the data block and the corresponding hash value in the data mapping table; if the hash value does not exist in the hash mapping table, saving the mapping relationship between the hash value and the corresponding original data content in the hash mapping table and then saving the mapping relationship between the data block and the corresponding hash value in the data mapping table.

Preferably, the network service operation data comprises network service operation detailed information reflecting user's network operation details.

In some embodiments, the data segmenting module further comprises:

A segmenting unit for segmenting the network service operation data according to a fixed length;

An adjusting unit for moving the segmentation boundary of the network service operation data back and forth according to a predetermined byte range till a byte string with the highest occurrence probability, then replacing the segmentation boundary with starting position of the byte string.

Preferably, the data segmenting module further comprises:

A dictionary table loading unit for loading a byte string dictionary table, which contains the occurrence probability of the byte string.

Preferably, the byte string dictionary table is a fixed-length byte string dictionary table trained based on corpora.

In another aspect, the present invention provides a computer readable storage medium having stored thereon computer program instructions for performing the following steps on a computer:

Step S1, extracting high level network service operation data;

Step S2, segmenting the network service operation data to obtain a plurality of data blocks;

Step S3, calculating a hash value for each data block;

Step S4, determining whether the hash value already exists in the hash mapping table or not, if the hash value already exists in the hash mapping table, saving the mapping relationship between the data block and the corresponding hash value in the data mapping table; if the hash value does not exist in the hash mapping table, saving the mapping relationship between the hash value and the corresponding original data content in the hash mapping table and then saving the mapping relationship between the data block and the corresponding hash value in the data mapping table.

In another aspect, the present invention provides a computer device, comprising a processor and a memory, wherein the memory stores computer program instructions, wherein the computer program instructions are configured to execute the following steps when the processor is running:

Step S1, extracting high level network service operation data;

Step S2, segmenting the network service operation data to obtain a plurality of data blocks.

Step S3, calculating a hash value for each data block;

Step S4, determining whether the hash value already exists in the hash mapping table or not, if the hash value already exists in the hash mapping table, saving the mapping relationship between the data block and the corresponding hash value in the data mapping table; if the hash value does not exist in the hash mapping table, saving the mapping relationship between the hash value and the corresponding original data content in the hash mapping table and then saving the mapping relationship between the data block and the corresponding hash value in the data mapping table.

In some embodiments of the present invention, by utilizing features with a low frequency of network service changes, by extracting high level details of the operation of network services for segmenting and hash mapping, centralized compression and storage are performed, to achieve a high compression ratio of network forensics data storage. Simply and efficiently, they support forensics directly to obtain high level network operation details, to avoid secondary slow extraction of network raw byte streams.

BRIEF DESCRIPTION OF THE DRAWINGS

FIG. 4 is a schematic diagram of network service operation data;

FIG. 5 is a specific application schematic diagram of the method for compression and storage;

FIG. 6 is a specific application schematic diagram of data segmentation;

DETAILED DESCRIPTION OF THE INVENTION

The present invention will be clearly and completely described below with reference to the accompanying drawings.

Figure 1:
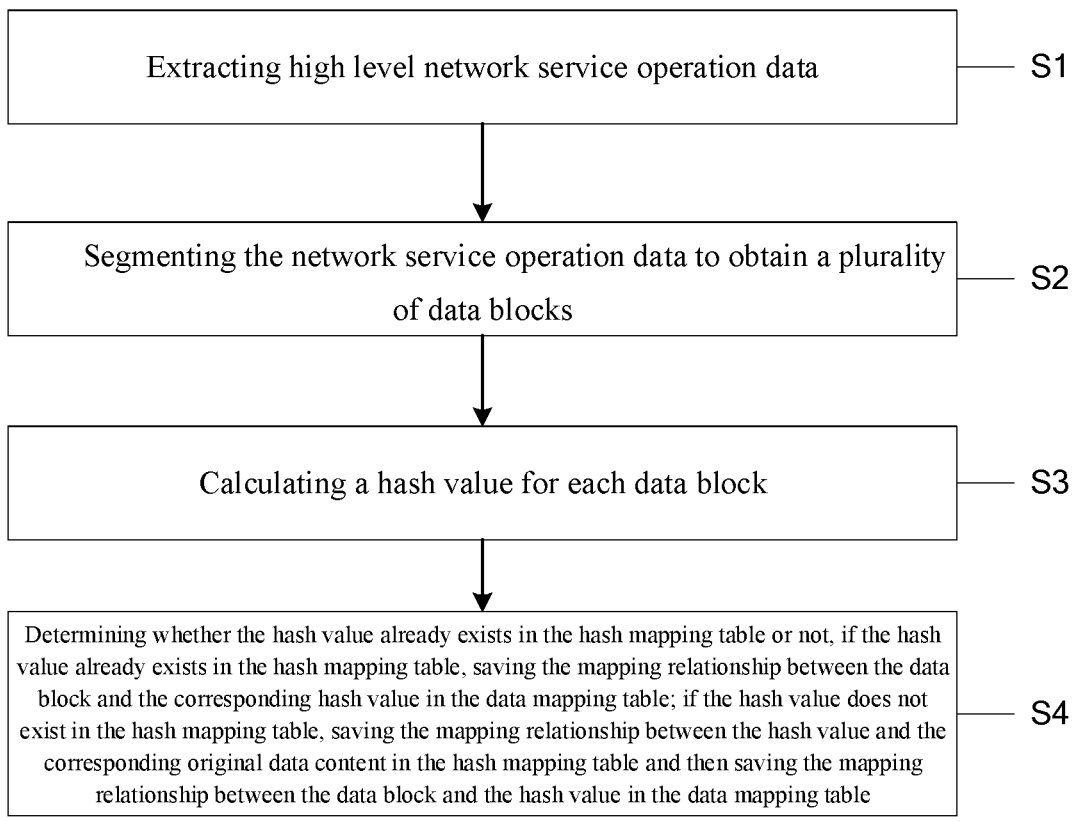
FIG. 1 is a schematic flow chart of a method for network forensic compression and storage according to an embodiment of the present invention.

FIG. 1 is a schematic flow chart of a method for network forensic compression and storage according to an embodiment of the present invention. As shown in FIG. 1, the method comprises the following steps:

Step S1, extracting high level network service operation data;

Step S2, segmenting the network service operation data to obtain a plurality of data blocks;

Step S3, calculating a hash value for each data block;

Step S4, determining whether the hash value already exists in the hash mapping table or not, if the hash value already exists in the hash mapping table, saving the mapping relationship between the data block and the corresponding hash value in the data mapping table; if the hash value does not exist in the hash mapping table, saving the mapping relationship between the hash value and the corresponding original data content in the hash mapping table and then saving the mapping relationship between the data block and the corresponding hash value in the data mapping table.

In some embodiments of the present invention, the extracted high level network service operation data includes network service operation details, which reflect the user's network operation details and can be used to perform network forensics on the user's network operation behaviour.

In a real network environment, most webpage content accessed by different users at different time generally do not have much difference. Therefore, by taking advantage of this feature of low frequency of network service change, by segmenting the network service operation data, the duplicate data blocks are segmented and stored, avoiding duplicate storage of the same data block contents. At the same time, compression and storage of hash-mapped transforms on segmented data blocks further reduce the need for storage space.

Figure 2:
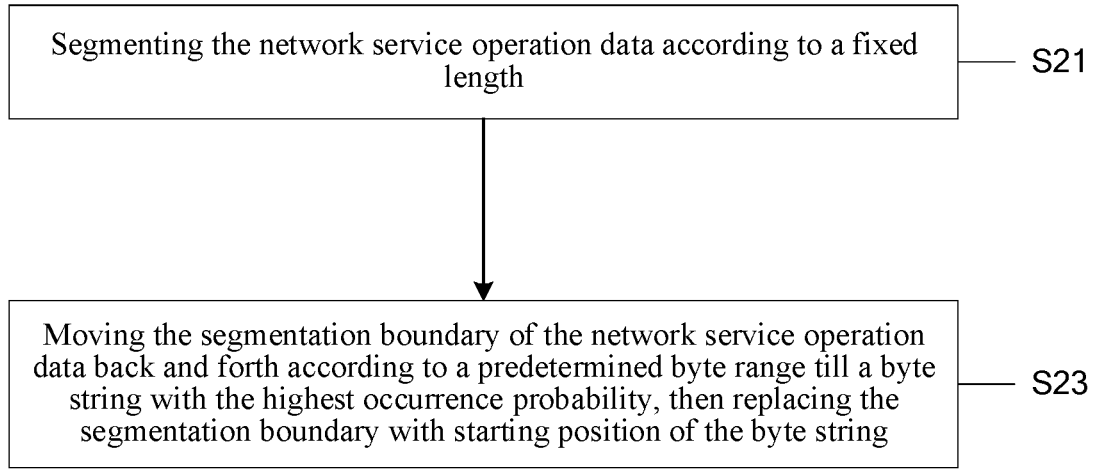
FIG. 2 is a schematic flow chart of one embodiment of data segmenting according to the present invention.

FIG. 2 is a schematic flow chart of one embodiment of data segmenting according to the present invention. As shown in FIG. 2, segmenting the extracted network service operation data is performed through the following steps:

Step S21, first, segmenting the network service operation data according to a fixed length;

Step S23, moving the segmentation boundary of the network service operation data back and forth according to a predetermined byte range till the byte string with the highest occurrence probability, then replacing the segmentation boundary with the starting position of the byte string.

In some embodiments of the present invention, the fixed length of data segmentation may be set according to actual needs, for example, 4K bytes.

Figure 3:
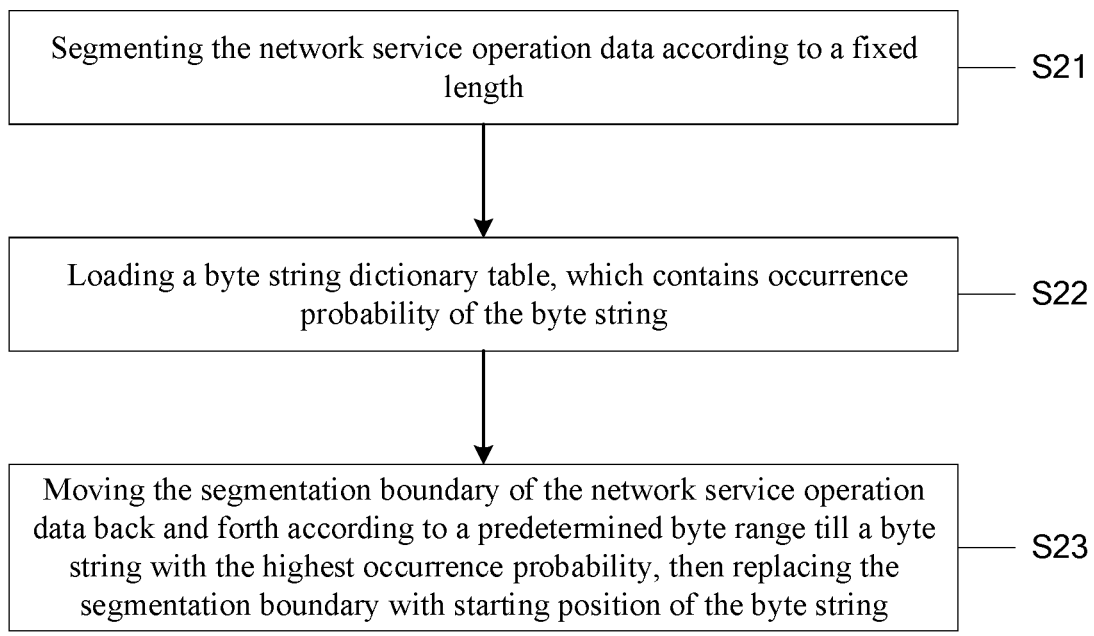
FIG. 3 is a schematic flow chart of another embodiment of data segmenting according to the present invention.

FIG. 3 is a schematic flow chart of another embodiment of data segmenting according to the present invention. As shown in FIG. 3, before step S23, it further comprises:

Step S22, loading a byte string dictionary table, which contains occurrence probability of the byte string.

In the embodiment of the present invention, the byte string dictionary table is a fixed-length byte string dictionary table trained based on corpora, and the step S23 determines the segmentation boundary of the data block based on the occurrence probability of the byte string in the byte string dictionary table.

The embodiments of the present invention are further described below with reference to the specific application examples shown in FIGS. 4-6.

For example, user A, user B, and user C respectively visit the website http://somewebsite.com/home.html.

FIG. 4 exemplarily shows network service operation data when user A, user B, and user C access the webpage http://somewebsite.com/home.html respectively at different time. As shown in FIG. 4, comparing network service operation data of user A, user B, and user C accessing the webpage at different time respectively, it can be seen that the network service operation data when user A, user B, and user C respectively access the webpage at different time record time, user name, and webpage access content. The content of the other data is the same except for the month in the time and the user name (in bold italics in the figure).

FIG. 5 exemplarily shows a specific implementation of compressing and storing the network service operation data of user A and user B in FIG. 4 according to an embodiment of the present invention. As shown in FIG. 5, a hash mapping table and a data mapping table are stored in the network forensic storage unit. First, the extracted network service operation data when user A visited the above website on Jan. 1, 2017 is divided into two data blocks [Time . . . UserA] and [In RocksDB, the LSM tree is consistent of a list . . . ] according to the occurrence probability of the byte string contained in the network service operation data. Hash transformation is performed on each of the data blocks to obtain a hash value thereof. Because at this moment, the mapping relationship of the hash values are not saved in the hash mapping table, first, the mapping relationship between the hash value and the corresponding original data content is sequentially saved in the hash mapping table, and then the mapping relationship between the data block and the corresponding hash value is saved in the data mapping table.

In the embodiment of the present invention, the data blocks in the data mapping table may be specifically identified by the byte range of the data block in the network service operation data, but not limited thereto. Other manners of identifying the data blocks may also be adopted.

Subsequently, the extracted network service operation data when user B visited the above website on Jan. 1, 2017 is accordingly divided into two data blocks [Time . . . UserB] and [In RocksDB, the LSM tree is consistent of a list . . . ] according to the occurrence probability of the byte string contained in the network service operation data. For each of the data blocks, a hash transformation is also performed to obtain a hash value thereof. As for the data block [Time . . . UserB], since the hash value thereof does not exist in the hash mapping table, the mapping relationship between the hash value and the corresponding original data content is firstly saved in the hash mapping table, and then the mapping relationship between the data block and the corresponding hash value is saved in the data mapping table; as for the data block [In RocksDB, the LSM tree is consistent of a list . . . ], since the hash value thereof already exists in the hash mapping table, the mapping relationship between the data block and the corresponding hash value is directly saved in the data mapping table.

Through the above segmentation and hash transformation, the repeated access contents in the network service operation data of user A and user B need only be saved once, and the storage space is greatly saved through the hash transformation and the mapping storage of the data blocks, and in the post-event forensic analysis stage, it is easy to get access to the user's network operation details, to avoid performing secondary slow extraction operation on the low-level original byte stream of the network.

In the embodiment of the present invention, the method for segmenting the network service operation data adopts a mode of variable-length data segmenting, which has a higher block reuse rate with respect to the fixed length segmenting. FIG. 6 shows a comparison of application examples in which user A and user B's network service operation data respectively are segmented in fixed length and variable-length. As shown in FIG. 6, when user A and user B have different lengths of user name byte strings, a fixed length segmenting method (the first data block obtained by segmenting in the figure is indicated in bold italics) may result in that the repeated content of the access content [In RocksDB, the LSM tree is consistent of a list . . . ] in the network service operation data of user A and user B is cut off and saved separately, thereby reducing the reuse rate of data blocks; however, in the variable-length data segmenting method, the segmentation boundary of the network service operation data of the user A and the user B is adjusted according to the start position of the byte string with the highest probability of occurrence. Although the user name byte strings of user A and user B are different, the duplicate access content part [In RocksDB, the LSM tree is consistent of a list . . . ] in the network service operation data of two users will still be segmented, improving the reuse rate of data blocks.

Figure 7:
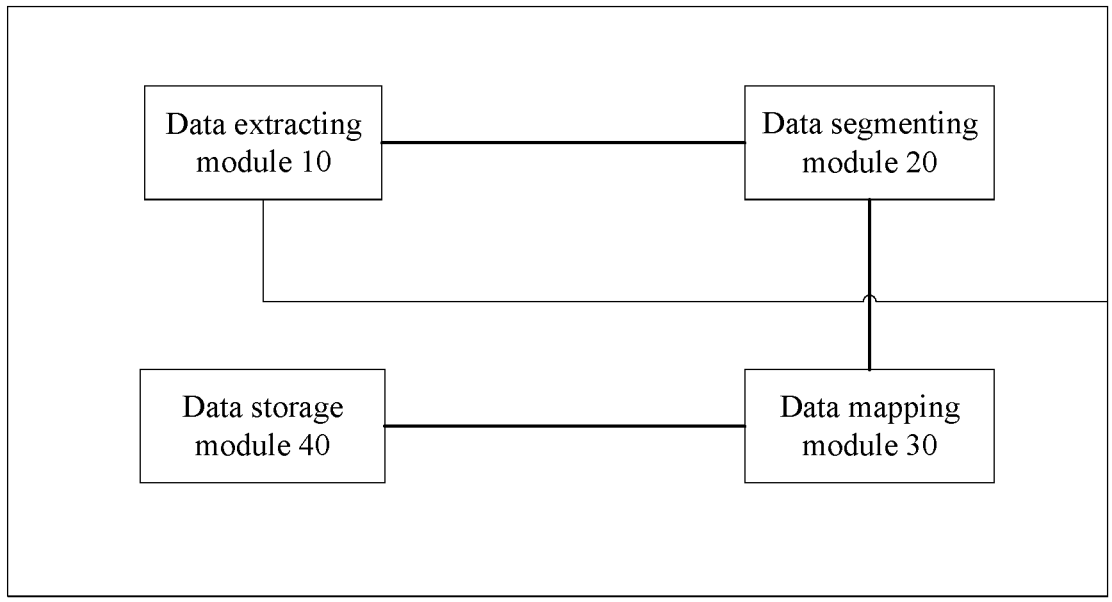
FIG. 7 is a schematic structural diagram of an apparatus for network forensics compression and storage.

FIG. 7 is a schematic structural diagram of an apparatus for network forensic compression and storage according to an embodiment of the present invention. As shown in FIG. 7, the apparatus for network forensic compression and storage comprises the following modules:

A data extracting module 10 for extracting high level network service operation data;

A data segmenting module 20 for segmenting the network service operation data extracted by the data extraction module to obtain a plurality of data blocks;

A data mapping module 30 for calculating a hash value for each data block obtained by the data segmenting module;

A data storage module 40 for determining whether the hash value already exists in the hash mapping table or not, if the hash value already exists in the hash mapping table, saving the mapping relationship between the data block and the corresponding hash value in the data mapping table; if the hash value does not exist in the hash mapping table, saving the mapping relationship between the hash value and the corresponding original data content in the hash mapping table and then saving a mapping relationship between the data block and the corresponding hash value in the data mapping table.

Figure 8:
FIG. 8 is a schematic structural diagram of an embodiment of a data segmenting module according to the present invention.

FIG. 8 is a schematic structural diagram of an embodiment of a data segmenting module according to the present invention. As shown in FIG. 8, the data segmenting module comprises the following units:

A segmenting unit 201 for segmenting the network service operation data according to a fixed length;

An adjusting unit 203 for moving the segmentation boundary of the network service operation data back and forth according to a predetermined byte range till a byte string with the highest occurrence probability, then replacing the segmentation boundary with starting position of the byte string.

Figure 9:
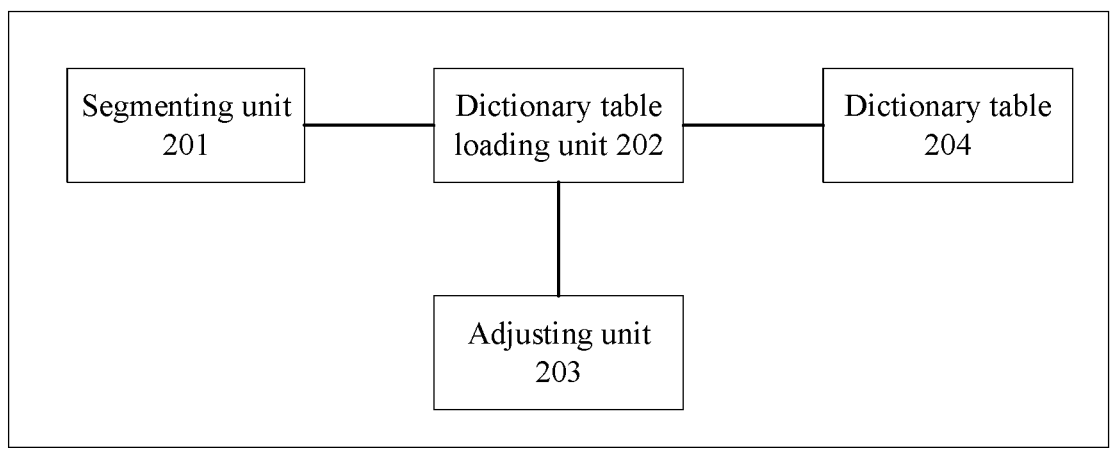
FIG. 9 is a schematic structural diagram of another embodiment of a data segmenting module according to the present invention.

FIG. 9 is a schematic structural diagram of another embodiment of a data segmenting module according to the present invention. As shown in FIG. 9, in addition to the segmenting unit 201 and the adjusting unit 203 described in FIG. 8, the data segmenting module in this embodiment further includes the following units:

A dictionary table loading unit 202 for loading a byte string dictionary table, which contains the occurrence probability of the byte string.

In the embodiment of the present invention, the byte string dictionary table is a fixed-length byte string dictionary table trained based on corpora, and the adjusting unit 203 determines the segmenting boundary of the data block based on the occurrence probability of the byte string in the byte string dictionary table.

In another aspect, the present invention provides a computer readable storage medium having stored thereon computer program instructions for performing the following steps on a computer:

Step S1, extracting high level network service operation data;

Step S2, segmenting the network service operation data to obtain a plurality of data blocks;

Step S3, calculating a hash value for each data block;

Step S4, determining whether the hash value already exists in the hash mapping table or not, if the hash value already exists in the hash mapping table, saving the mapping relationship between the data block and the corresponding hash value in the data mapping table; if the hash value does not exist in the hash mapping table, saving the mapping relationship between the hash value and the corresponding original data content in the hash mapping table and then saving the mapping relationship between the data block and the corresponding hash value in the data mapping table.

In another aspect, the present invention also provides a computer device, comprising a processor and a memory, wherein the memory stores computer program instructions, wherein the computer program instructions are configured to execute the following steps when the processor is running:

Step S1, extracting high level network service operation data;

Step S2, segmenting the network service operation data to obtain a plurality of data blocks;

Step S3, calculating a hash value for each data block;

Step S4, determining whether the hash value already exists in the hash mapping table or not, if the hash value already exists in the hash mapping table, saving the mapping relationship between the data block and the corresponding hash value in the data mapping table; if the hash value does not exist in the hash mapping table, saving the mapping relationship between the hash value and the corresponding original data content in the hash mapping table and then saving a mapping relationship between the data block and the corresponding hash value in the data mapping table.

Through the practical application testing, the method provided in some embodiments of the present invention can greatly improve the compression efficiency compared with the traditional compression and storage method, with an average compression ratio up to 25 times for network forensics data, and is simple to implement, while supports directly obtaining high level network operation details during forensics and avoids performing secondary slow extraction operation on the original byte stream of the network.

The invention claimed is:

1. A method for network forensics compression and storage, comprising the following steps:
   Step S1, extracting high level network service operation data;
   Step S2, segmenting the network service operation data to obtain a plurality of data blocks;
   Step S3, calculating a hash value for each data block;
   Step S4, determining whether the hash value already exists in the hash mapping table or not, if the hash value already exists in the hash mapping table, saving the mapping relationship between the data block and the corresponding hash value in the data mapping table;
   if the hash value does not exist in the hash mapping table, saving the mapping relationship between the hash value and the corresponding original data content in the hash mapping table and then saving the mapping relationship between the data block and the corresponding hash value in the data mapping table,
   wherein the network service operation data comprises network service operation detailed information reflecting user's network operation details, and
   wherein the step of segmenting the network service operation data in step S2 comprises the following steps:
      Step S21, segmenting the network service operation data according to a fixed length;
      Step S23, moving the segmentation boundary of the network service operation data back and forth according to a predetermined byte range till a byte string with the highest occurrence probability, then replacing the segmentation boundary with starting position of the byte string.

2. The method according to claim 1, wherein before step S23, it further comprises:
   Step S22, loading a byte string dictionary table, which contains occurrence probability of the byte string.

3. The method according to claim 2, wherein the byte string dictionary table is a fixed-length byte string dictionary table trained based on corpora.

4. An apparatus for network forensic compression and storage, comprising the following modules stored as computer program instructions in non-transitory memory:

a data extracting module in non-transitory memory for extracting high level network service operation data;

a data segmenting module in non-transitory memory for segmenting the network service operation data extracted by the data extraction module to obtain a plurality of data blocks;

a data mapping module in non-transitory memory for calculating a hash value for each data block obtained by the data segmenting module;

a data storage module in non-transitory memory for determining whether the hash value already exists in the hash mapping table or not, if the hash value already exists in the hash mapping table, saving the mapping relationship between the data block and the corresponding hash value in the data mapping table; if the hash value does not exist in the hash mapping table, saving the mapping relationship between the hash value and the corresponding original data content in the hash mapping table and then saving the mapping relationship between the data block and the corresponding hash value in the data mapping table, wherein the network service operation data comprises network service operation detailed information reflecting user's network operation details, wherein the data segmenting module further comprises:
a segmenting unit for segmenting the network service operation data according to a fixed length;
an adjusting unit for moving the segmentation boundary of the network service operation data back and forth according to a predetermined byte range till a byte string with the highest occurrence probability, then replacing the segmentation boundary with starting position of the byte string.

5. The apparatus according to claim 4, wherein the data segmenting module further comprises:
a dictionary table loading unit for loading a byte string dictionary table, which contains the occurrence probability of the byte string.

6. The apparatus according to claim 5, wherein the byte string dictionary table is a fixed-length byte string dictionary table trained based on corpora.

7. A computer readable storage medium having stored thereon computer program instructions in non-transitory memory for performing the following steps on a computer:
Step S1, extracting high level network service operation data;
Step S2, segmenting the network service operation data to obtain a plurality of data blocks;
Step S3, calculating a hash value for each data block;
Step S4, determining whether the hash value already exists in the hash mapping table or not, if the hash value already exists in the hash mapping table, saving the mapping relationship between the data block and the corresponding hash value in the data mapping table; if the hash value does not exist in the hash mapping table, saving the mapping relationship between the hash value and the corresponding original data content in the hash mapping table and then saving the mapping relationship between the data block and the corresponding hash value in the data mapping table,
wherein the network service operation data comprises network service operation detailed information reflecting user's network operation details, and
wherein the step of segmenting the network service operation data in step S2 comprises the following steps:
Step S21, segmenting the network service operation data according to a fixed length;
Step S23, moving the segmentation boundary of the network service operation data back and forth according to a predetermined byte range till a byte string with the highest occurrence probability, then replacing the segmentation boundary with starting position of the byte string.

8. The storage medium according to claim 7, wherein before step S23, it further comprises:
Step S22, loading a byte string dictionary table, which contains occurrence probability of the byte string.

9. The storage medium according to claim 8, wherein the byte string dictionary table is a fixed-length byte string dictionary table trained based on corpora.

* * * * *